US008262821B2

(12) United States Patent
Eykamp

(10) Patent No.: US 8,262,821 B2
(45) Date of Patent: Sep. 11, 2012

(54) JIG FOR MOUNTING MULTI-LAYER PAPER PRODUCTS

(76) Inventor: Matthew A. Eykamp, Portsmouth, VA (US)

( * ) Notice: Subject to any disclaimer, the term of this patent is extended or adjusted under 35 U.S.C. 154(b) by 483 days.

(21) Appl. No.: 12/504,698

(22) Filed: Jul. 17, 2009

(65) Prior Publication Data

US 2010/0012250 A1 Jan. 21, 2010

Related U.S. Application Data

(60) Provisional application No. 61/081,580, filed on Jul. 17, 2008.

(51) Int. Cl.
*B32B 37/00* (2006.01)

(52) U.S. Cl. .......................................... 156/60; 156/349

(58) Field of Classification Search .................... 156/60, 156/349, 297
See application file for complete search history.

(56) References Cited

U.S. PATENT DOCUMENTS 2,669,775 A * 2/1954 Barnes ............................ 269/13
2,845,716 A * 8/1958 Culver et al. ................... 33/645
2,857,632 A * 10/1958 Gonser ......................... 156/300
2,871,572 A * 2/1959 Gutzmer ......................... 33/623
3,679,198 A 7/1972 Weggeland
4,525,062 A * 6/1985 Clark .............................. 355/72
4,739,558 A * 4/1988 Black ................................ 33/42
5,458,938 A * 10/1995 Nygard et al. ............... 428/40.2
5,501,260 A * 3/1996 Young ........................... 156/247
5,592,288 A * 1/1997 Sampica et al. ................ 356/62
5,680,709 A * 10/1997 Stone .............................. 33/613
6,013,345 A * 1/2000 Koshida et al. ................. 428/78
6,082,547 A * 7/2000 Nentl et al. ................... 206/724
2004/0221751 A1* 11/2004 Arnold ........................... 101/3.1
2011/0042003 A1* 2/2011 Balmer et al. ................ 156/325

FOREIGN PATENT DOCUMENTS

JP 2002-256229 A * 9/2002

OTHER PUBLICATIONS

International Search Report and Written Opinion, Application No. PCT/US09/50929; mailing date Aug. 27, 2009.
International Preliminary Report of Patentability; Application No. PCT/US2009/050929; mailing date Jan. 27, 2011; 7 pages.

* cited by examiner

*Primary Examiner* — Jeff Aftergut
(74) *Attorney, Agent, or Firm* — Thomas & Karceski, P.C.

(57) ABSTRACT

A jig is used in the assembly of a laminated end product. The jig includes a generally flat sheet of rigid material that has a first step configured in the surface of that flat sheet. A laminated product such as an invitation is mounted on the jig. A second leaf is then mounted on the jig at the larger line of the step to perfectly align the first and second leafs on the jig.

13 Claims, 5 Drawing Sheets

JIG FOR MOUNTING MULTI-LAYER PAPER PRODUCTS

The present application claims the benefit of U.S. Provisional Patent Application No. 61/081,580, filed Jul. 17, 2008, entitled "Paper Mounting System."

The present invention is directed to a jig tool that is used in the assembly of paper invitations, photography or art, or any similar formation of a multi-layer laminated product.

BACKGROUND

There is a significant industry that relates to the design and preparation of high end stationery and custom invitations. One of the most difficult and tedious problems that is faced by businesses in this custom business is the manual mounting of paper on top of other paper as hand-made invitations are designed and assembled. The same difficulties are faced by businesses lining up photographs or other artistic pieces on a backing piece of paper or other thin material.

Custom invitations may typically have at least three mounts, and order quantities may range from a few dozen to several hundred invitations depending on an event and client. This manual mounting process is very time-consuming and, if the assembler is not skilled, can result in a large expense as the paper can be wasted during assembly. To perform a mount, a top piece of paper is pre-glued on its back side. It is then held over a bottom piece until the assembler believes that they have the placement correct. If an assembler is very steady and a bit lucky, the assembler can place the top piece of paper dead-center the first time. Regardless of the placement, the two expensive pieces of paper are glued together essentially as soon as they touch.

Creative people work very diligently to create unique and beautiful products. The invitation business complicates this by necessitating the duplication of an agreed upon model. Ideally, this model must be replicated perfectly multiple times. Unfortunately, to manage quality, the necessity of replication means that the creative person must move from creativity to redundancy, effectively becoming a factory worker for the time it takes to assemble an item multiple times.

SUMMARY

Accordingly, it is an object of the present invention to provide a solution to the foregoing problems that are inherent in the assembly of multiple layer, laminated invitations or photography/art mount products. In short, the present invention includes a jig having predetermined steps integrated therein that can allow for rapid and accurate assembly of a laminated product such as an invitation or stationery.

In one example, a jig is used in the assembly of a laminated end product. The jig comprises a generally flat sheet of rigid material. A first step is configured in the surface of the flat sheet wherein there is a top plane, first step plane and base plane and two generally vertical risers connecting the respective top plane and first step plane, and the first step plane and base plane. The first step and base planes are generally parallel to each other. The first step plane may comprise two legs forming substantially an L-shape, wherein the two legs are substantially perpendicular with respect to each other. The width of each leg of the step plane, defined as the shortest distance across the step plane in between the risers, is uniform across each leg of the step plane, and each leg may have a different width. The jig may also comprise a second step configured in the surface of the flat sheet. In this example, there is a second step plane and a third generally vertical riser, the third vertical riser connecting the respective top plane and first step plane, the second vertical riser connecting the first step plane and the second step plane, and the first vertical riser connecting the second step plane and the base plane. The first and second step and base planes are generally parallel to each other.

In another example, a method is described of forming a laminated end product. The method includes providing a jig for use in the assembly of a laminated end product, the jig comprising a generally flat sheet of rigid material. A first step is configured in the surface of the flat sheet wherein there is a top plane, first step plane and base plane and two generally vertical risers connecting the respective top plane and first step plane and the first step plane and base plane. The first step and base planes are generally parallel to each other. A first flat leaf is provided and positioned on the base plane of the jig so that the edges of the first leaf are in contact with the riser between the base plane and the first step plane. An adhesive material is applied to a portion of the exposed side of the first flat leaf. A second flat leaf is then laid onto the first flat leaf so that the edges of the second leaf are in contact with the riser between the first step plane and the top plane. The result is first and second flat leafs that are adhered together and form a laminated end product. One or more of the flat leafs may be comprised of paper.

DETAILED DESCRIPTION

A jig can be used to rapidly and accurately laminate flat sheets together to form a multi-layered end product. Examples of jigs are described herein in the context of one common use which is the assembly of multi-leaf invitations or announcements. Of course, other uses can be seen and used including, but not limited to, the matting of photographs or the other assembly of flat leaf materials such as paper and plastic film.

Figure 1:
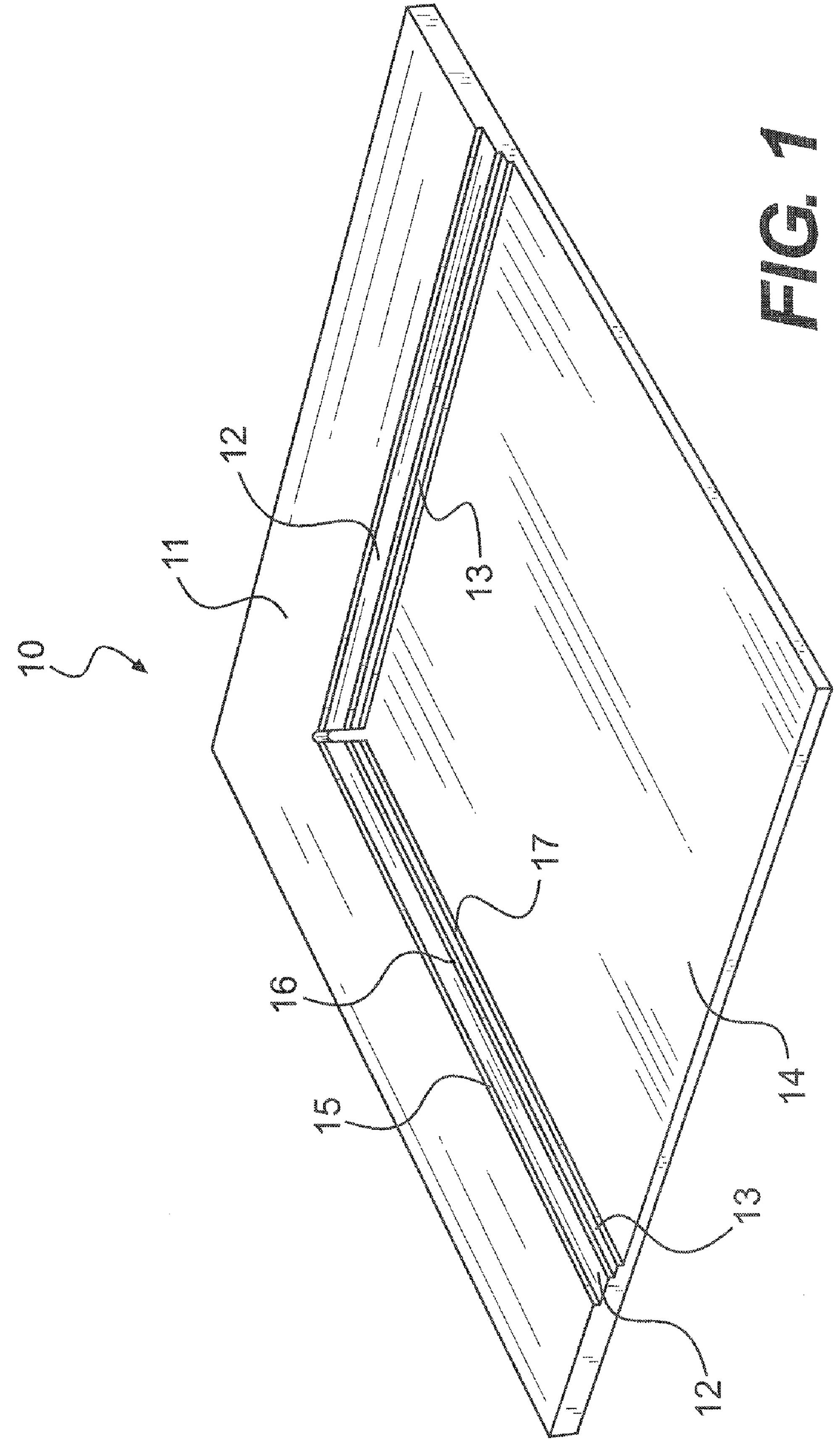
FIG. 1 is a perspective view of a jig in accordance with an embodiment of the present jig.
Figure 2:
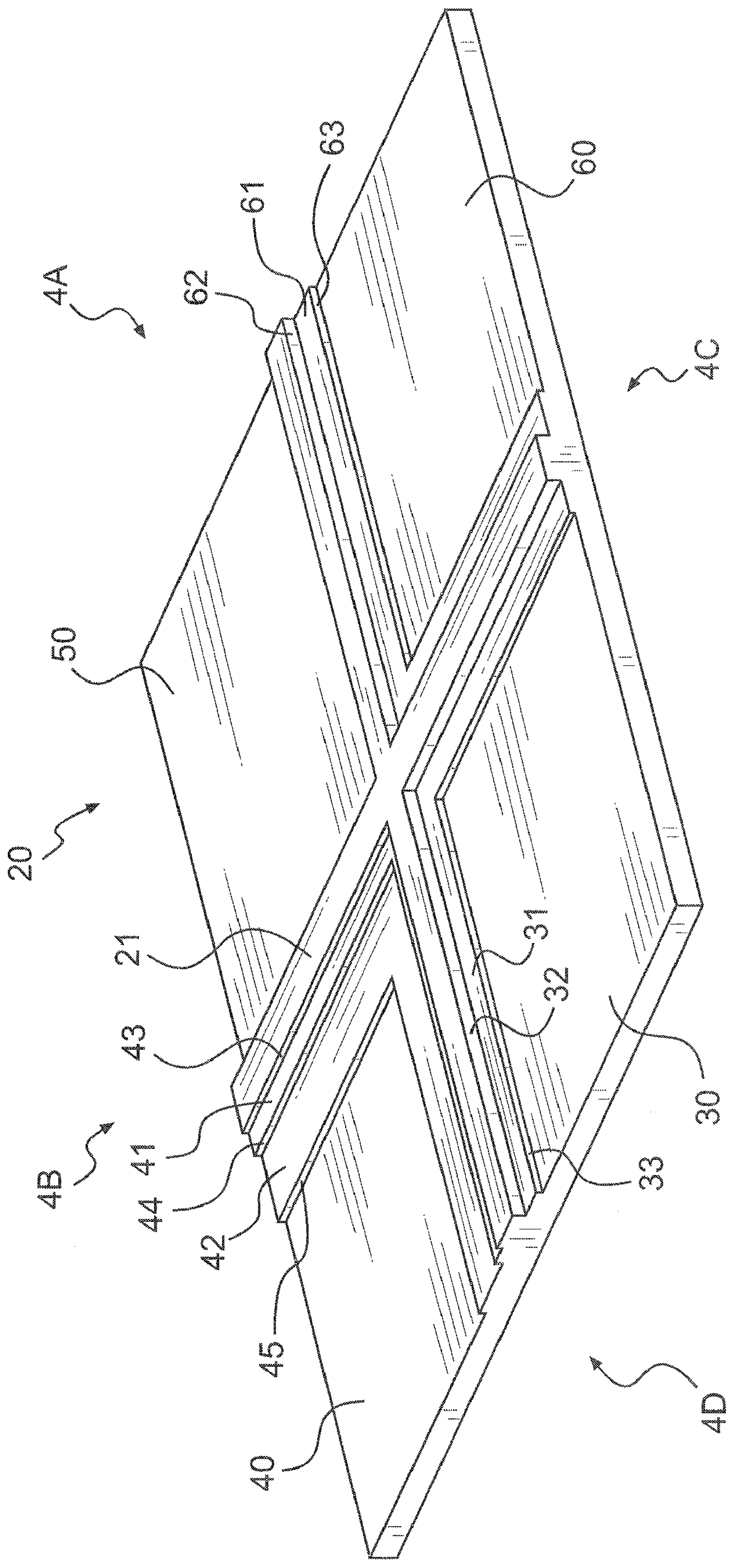
FIG. 2 is a perspective view of an alternative embodiment of a jig.
Figure 3:
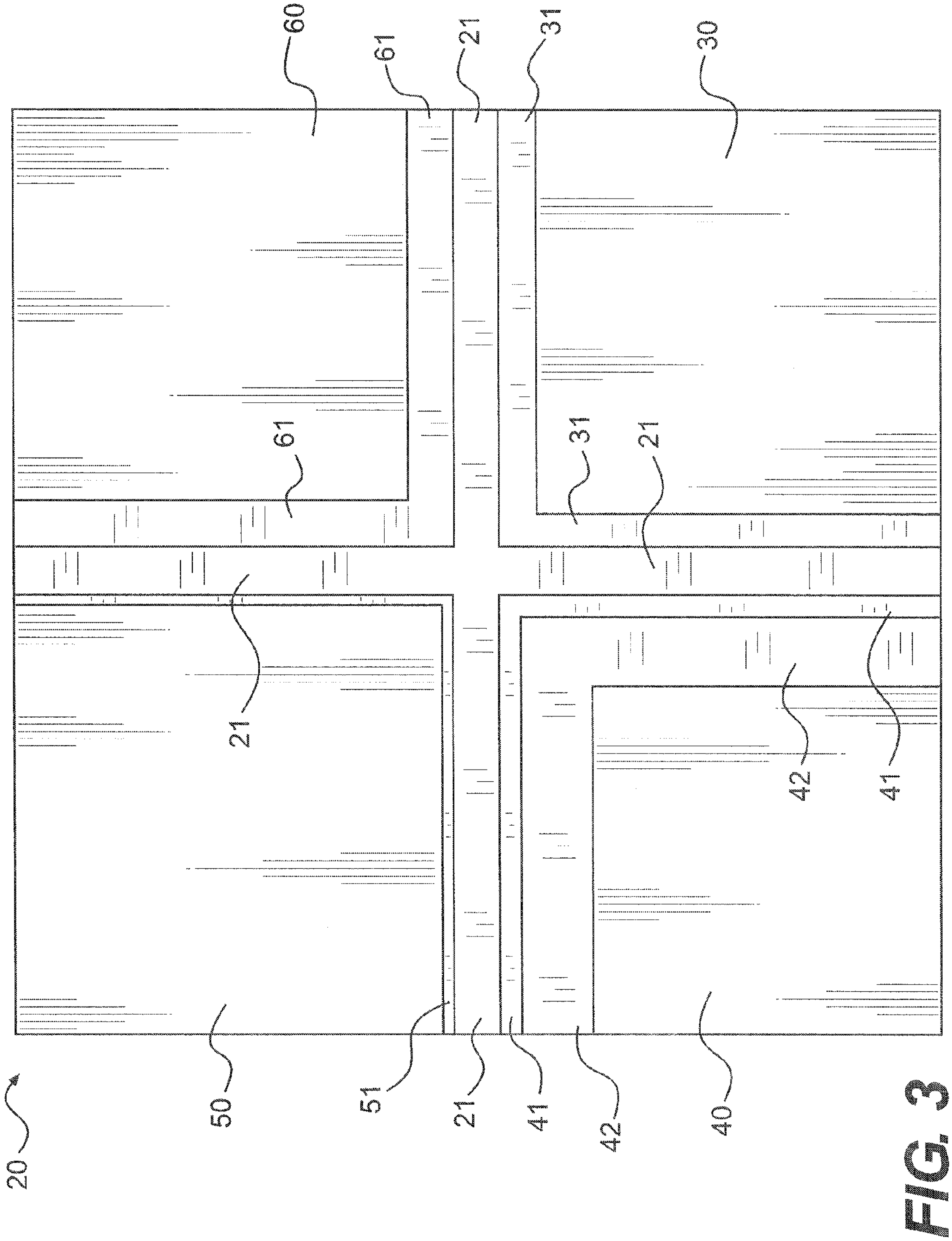
FIG. 3 is a top plan view of the jig shown in FIG. 2.
Figure 4A:
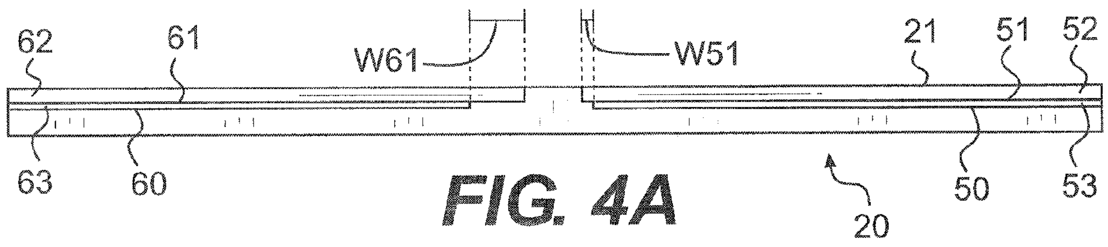
FIGS. 4A-D are side elevation views of the jig shown in FIG. 2 taken along each of the four sides of that jig.
Figure 4B:
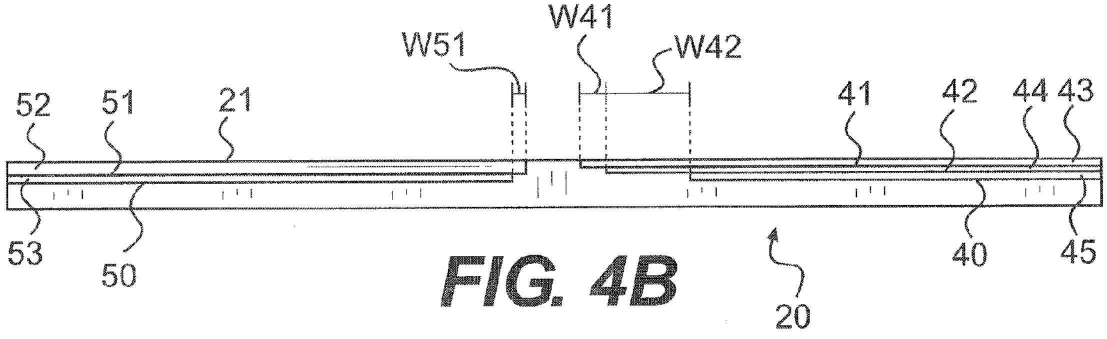
Figure 4C:
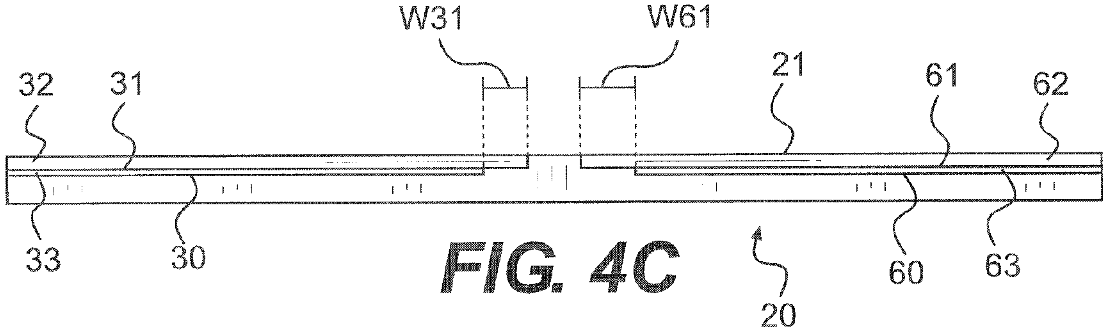
Figure 4D:
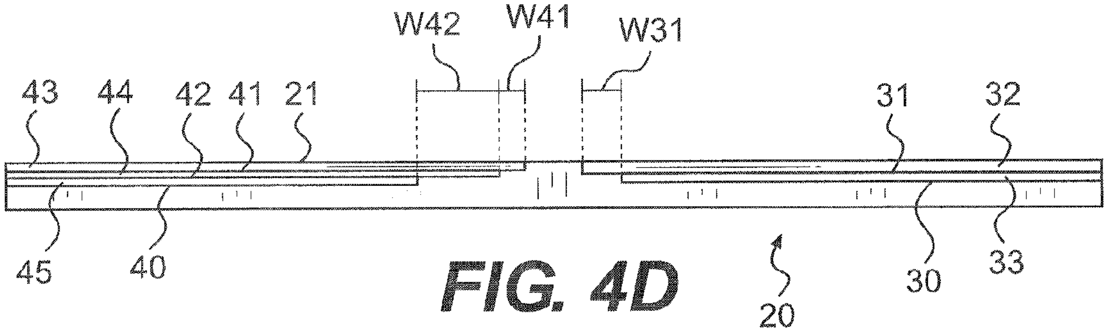

Turning now to FIG. 1, the jig 10 is comprised of a rigid material such as aluminum or stainless steel. The jig 10 is made up of a top plane 11, first step plane 12, second step plane 13 and base plane 14. The first, second and base planes 12, 13 and 14 are generally parallel to each other. Three risers 15, 16 and 17 separate the top plane 11 and first step plane 12, the first step plane 12 and second step plane 13, and second step plane and base plane 14 respectively. The width of the step planes 12 and 13 is measured by the shortest distance across the plane from riser 15 to riser 16 and riser 16 to riser 17 respectively that define the planes. As shown, the first and second step planes 12 and 13 are uniform in their width, but each step plane is different in width from the other step plane. Each of the step planes 12 and 13 is formed in an L-shape with two legs. The respective legs of the first step plane 12 and the respective legs of the second step plane 13 are each uniform in width.

Turning now to FIGS. 2, 3 and 4A-D, another example of a jig 20 is shown. In fact, the jig 20 is four jigs on one plate. The four different jig sections are referred to separately by their respective base planes 30, 40, 50 and 60 that appear generally as four quadrants of the overall jig 20. Functionally, each of the four jig sections on the quadrants of jig 20 is equivalent to the jig 10 shown in FIG. 1. The jig 20 is essentially square in shape. The jig 20 is divided into four corners by a top plane 21 that forms an "x" on the top of the jig. Each of the corners or quadrants of the jig 20 defines a separate jig. In the first corner of jig 20, there is a base plane 30 and a step plane 31. A first riser 32 separates the top plane 21 and the step plane 31. A second riser 33 separates the step plane 31 and the base plane 30. In another corner of the jig 20, there is a base plane 40 and first and second step planes 41 and 42. Risers 43, 44 and 45 separate the top plane 21, first plane 41, second plane 42, and base plane 40. In a still further corner of the jig 20 there is a base plane 50 and step plane 51. Risers 52 and 53 separate the top plane 21, step plane 51 and base plane 50. In the fourth corner of the jig 20, there is a base plane 60 and step plane 61. Risers 62 and 63 separate the top plane 21, step plane 61 and base plane 60.

The width of the step planes 31, 41, 42, 51 and 61 shown on jig 20 are each different from each other. This allows for a user to select different step plane widths on the jig to accommodate different mounting width geometries. In one example, the step planes 31, 41, 42, 51 and 61 may have mounting geometries of ⅛ inch, ¼ inch, ⅜ inch, ½ inch and ¾ inches (not necessarily in respective order). And in the quadrant of base plane 40, a user could combine and use both step planes 41 and 42 to obtain a further width geometry. Other widths could be chosen depending on common needs for different users. Also, the widths $W_{31}$, $W_{41}$, $W_{42}$, $W_{51}$, and $W_{61}$ of each of the step planes 31, 41, 42, 51 and 61 are each uniform across both legs of their length. It is believed that this would be the most common use for a jig of this type. However, it is possible that the two legs on an L-shaped step plane could be different. The ultimate width of each step plane and, possibly each leg on a step plane is subject to the intended purpose in the assembly of a multi-layer product. Also, the steps are shown having legs that are perpendicular to each other to form an L-shape. This perpendicular format is also useful with any even-sided polygons (e.g., hexagons and octagons) as well as true circular designs. It is conceivable that the thin leaf products that are being laminated together would have other geometries other than a rectangular shape. Therefore, a highly-specific geometry that could conceivably include curved lines can be machined into a jig for a very specific laminate end product.

Jig 20 is a multi-section jig having four corners or quadrants. It is alternatively envisioned that a jig could have two or three or more than four sections with each section able to itself function as jigs described herein.

The jigs 10 and 20 that are shown are typically made of a metal or plastic material. The metal can be aluminum or stainless steel or any other metal. Likewise, the plastic can be any relatively rigid plastic material. The material of a jig can be coated, for instance, with Teflon or other material for durability and workability. The step planes on the jig can be colored to improve the repetitive use. The different widths of the jig can be color-coded by width. Different quadrants or single sections of a multi-section jig can have different colors. The jig needs to be large enough to reasonably handle and support the expected paper and plastic products that will be mounted on it. In one example of a jig like jig 20, the jig is square and is ten inches by ten inches.

In general, the risers disclosed herein on the jig should be substantially vertical to the planes that they respectively connect. In one prototype example, the height of the risers is about 0.06 inches. In other examples, the height of the risers could be about 0.01 inch to one inch. The risers could be any height large enough to brace paper or a thin leaf or a small pad, but not so high as to make it difficult to layer or distort the layering of one leaf onto another.

The method of use is simple and intuitive. A user can easily layer thin leaf materials onto each other. It is expected that the common leaf material for use with, for instance, invitations and announcements, is a paper product. However, the leaf material could easily include plastic films, photographs, cardboard matting, and other similar thin products. The jig described herein is primarily effective when the respective leaf pieces to be laminated together are length to length and width to width proportional (when using rectangular leaf pieces). Of course, the jig could be used to assemble polygonal or curved or asymmetric layers or in some other artistic or intended fashion.

Figure 5:
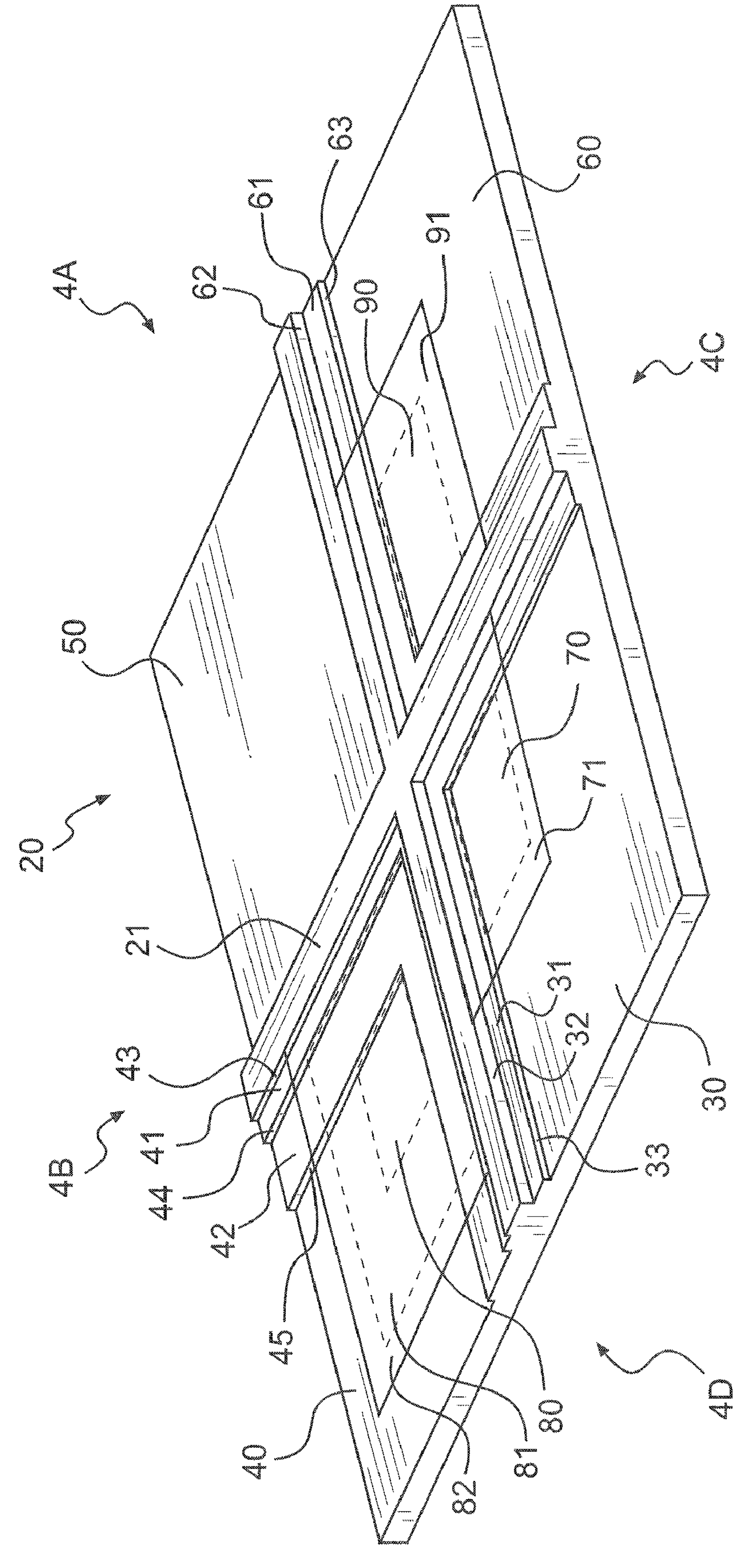
FIG. 5 is a perspective view of the jig shown in FIG. 2 having representative invitations shown being assembled on the jig.

With reference now to FIG. 5, three different leaf laminate products are shown being assembled together on the jig 20. In a first quadrant or corner, a small rectangular leaf with paper 70 is mounted in the corner on the base plane 30 and against the riser 33. A second leaf 71, larger in length and width than the first leaf 70, is then laid on top of the first leaf 70. An adhesive may be applied to the back of the first leaf 70 or to the front of the leaf 71 so that the two leaf pieces are adhered together. In the other quadrants, a three leaf laminated end product is shown made of a first leaf 80, second leaf 81, and third leaf 82. They are mounted on top of each other respectively and adhered together with some adhesive. Similarly, a two-layer laminated product made up of first leaf 90 and second leaf 91 is assembled similar to the first laminated product comprised of leaf 70 and second leaf 71. The difference would be the margin of overlap in that the overlap of the composite product of leaf 90 and leaf 91 is larger than the margin of the overlap of leaf 70 and leaf 71. It is possible to use the jig 20 to layer as many different products as desirable to create a laminated end product. A user can simply select which margin of overlap they desire and layer the leaf portions accordingly.

Having thus described and detailed the present invention, it is to be understood that many obvious and apparent variations in construction and arrangement may be made without departing from the overall scope and spirit thereof as defined by the appended claims. Furthermore, it is intended that the foregoing specifications and accompanying drawings be interpreted as illustrative rather than in a limiting sense.

What is claimed is:

1. A method of forming a laminated end product, the method comprising the steps of:

providing a jig for use in the assembly of a laminated end product, the jig comprising:

a generally flat sheet of rigid material;

a first step configured in the surface of the flat sheet wherein there is a top plane, first step plane and base plane and two generally vertical risers connecting the respective top plane and first step plane, and the first step plane and base plane;

wherein the first step and base planes are generally parallel to each other;

providing a first flat leaf and positioning the leaf on the base plane of the jig so that the edges of the first leaf are in contact with the riser between the base plane and the first step plane;

applying an adhesive material to a portion of the exposed side of the first flat leaf;

laying a second flat leaf onto the first flat leaf so that the edges of the second leaf are in contact with the riser between the first step plane and the top plane;

whereby the first and second flat leafs are adhered together and form a laminated end product.

2. A method of forming a laminated end product as described in claim 1, wherein the jig further comprises a second step configured in the surface of the flat sheet, wherein there is a second step plane and a third generally vertical riser, the three vertical risers connecting the respective top plane and first step plane, the first step plane and the second step plane, and the second step plane and the base plane; and wherein the first and second step and base planes are generally parallel to each other;

applying an adhesive material to a portion of the exposed side of the second leaf;

laying a third flat leaf onto the second flat leaf so that the edges of the third leaf are in contact with the riser between the second step plane and the top plane;

whereby the first, second and third flat leafs are adhered together and form a laminated end product.

3. A method of forming a laminated end product as described in claim 1, wherein the first and second flat leafs are comprised of paper.

4. A method of forming a laminated end product as described in claim 1, wherein the first and second leafs are each rectangular in shape, and the relative length of each is substantially equally proportional to the relative width of each, and the length and width of the second leaf are greater than the length and width of the first leaf.

5. A jig for use in the assembly of a laminated end product, the jig comprising:

a generally flat sheet of rigid material;

a first step configured in the surface of the flat sheet wherein there is a top plane, first step plane and base plane and two generally vertical risers connecting the respective top plane and first step plane, and the first step plane and base plane; and wherein the first step and base planes are generally parallel to each other.

6. A jig as described in claim 5, wherein the width of the first step plane, defined as the shortest distance across the step plane and between the risers, is uniform across the first step plane.

7. A jig as described in claim 5, wherein the first step plane comprises two legs forming substantially an L-shape, wherein the two legs are substantially perpendicular with respect to each other.

8. A jig as described in claim 5, wherein the sheet of rigid material is rectangular in shape.

9. A jig as described in claim 5, wherein the width of each leg of the step plane, defined as the shortest distance across the step plane and between the risers, is uniform across each leg of the step plane, and each leg has a different width.

10. A jig as described in claim 5, further comprising a second step plane configured in the surface of the flat sheet, wherein there is a second step plane and a third generally vertical riser, the three vertical risers connecting the respective top plane and first step plane, the first step plane and the second step plane, and the second step plane and the base plane; and wherein the first and second step and base planes are generally parallel to each other.

11. A jig as described in claim 10, wherein the widths of the first and second step planes, defined as the shortest distance across the respective first and second step planes and between the respective risers, is uniform and across each step plane; and wherein the widths of the respective first and second steps are different from each other.

12. A jig as described in claim 10, wherein the first and second step planes each comprise two legs, each step plane forming substantially an L-shape, wherein the two legs of each step are substantially perpendicular with respect to each other.

13. A jig as described in claim 6 further comprising a second base plane and a second step plane and two generally vertical risers connecting the respective top plane and second step plane, and the second step plane and the second base plane;

wherein the second step plane and second base planes are generally parallel to each other;

wherein the width of the second step plane, defined as the shortest distance across the second step plane and between the risers, is uniform across the second step plane; and wherein the width of the first and second step planes is different; and whereby a multi-section jig is formed.

* * * * *